Dec. 16, 1969  D. L. KEELER  3,483,788
FASTENING DEVICE
Filed Nov. 13, 1968

INVENTOR.
DONALD L. KEELER
BY
Curtis, Morris & Safford
ATTORNEYS

# United States Patent Office 3,483,788
Patented Dec. 16, 1969

3,483,788
FASTENING DEVICE
Donald L. Keeler, Ambler, Pa., assignor to Standard Pressed Steel Co., Jenkintown, Pa., a corporation of Pennsylvania
Filed Nov. 13, 1968, Ser. No. 775,431
Int. Cl. F16b 21/00
U.S. Cl. 85—7                          2 Claims

ABSTRACT OF THE DISCLOSURE

A fastener pin of the type having a disposable stem separable from the fastener shank by rupturing an interconnecting frangible neck portion, wherein the disposable stem is made of a less expensive metal than the shank portion and is connected to the end of the shank by a stud weld having greater tensile strength than the neck portion.

---

This invention relates to a fastener pin of the type which cooperates with a locking collar which is swedged inwardly into engagement with one or more grooves or other forms of locking indentations in the shank of the pin, the swedging being accomplished by a power driven applicator tool which includes means for applying tension to a disposable stem portion which projects axially from the shank and which is connected to the end of the shank by a neck portion which breaks off after sufficient tension has been applied to complete the swedging of the collar into locking engagement with the shank.

Fasteners of this general type are disclosed, for example, in the expired U.S. Patent No. 2,531,048 issued Nov. 21, 1950.

Such fasteners have been used extensively in the aerospace industry. As is well known, the trend in that industry has been steadily toward the use of scarcer metals or more sophisticated alloys affording higher ratios of tensile strength to weight, and frequently high corrosion resistance as well. Among such metals now in current use are titanium and the newly developed cobalt-nickel-chromium-molybdenum alloys disclosed in U.S. Patent No. 3,356,542 issued Dec. 5, 1967 and known commercially under the trade name "Multiphase." Such metals are considerably more expensive than the stainless steels, for example, but their much higher strength/weight ratios recommend their use in the more critical aerospace applications. However, the relatively high cost of such materials has militated against their use in fasteners of the type described above, wherein a portion of the fastener pin is broken off and discarded in the course of application.

It is therefore among the objects of the present invention to provide a composite fastener pin for use in a fastener of the type described, wherein the permanent portion of the pin is formed of a high-cost metal and the disposable portion is formed of a dissimilar metal of substantially lower cost.

Another object is that of providing such a fastener which is susceptible of economical fabrication and which may be applied in the same manner to achieve the same performance as prior fastener pins integrally formed from a single piece of the higher cost metal.

Figure 1:
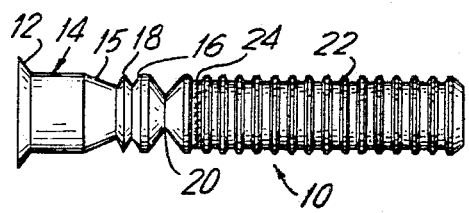
FIGURE 1 is a side elevational view of an illustrative composite fastener pin embodying certain features of the invention.

As may be seen in FIGURE 1, the illustrative fastener pin, generally designated 10, is provided with a countersunk head 12 (although other forms of head, such as flat heads, round heads, button heads, mushroom heads, brazier heads, tinner heads, etc. are equally applicable). Extending axially from the head 10 is a cylindrical shank, generally designated 14, which is provided with peripheral locking grooves 15 and 16 separated by an annular rib 18. Near the outer end of the shank, it is provided with a collar portion 20 of diameter substantially smaller than either of the grooves 15 and 16, so that upon being subjected to sufficient tensile stress, the shank will rupture at the collar portion 20.

Projecting axially from the free end of the shank 14 is a stem 22 which is preferably of a maximum diameter slightly less than that of the shank 14 and which is provided with a series of spaced peripheral grooves for engagement with gripping jaws of the applicator tool to transmit tension to the shank during application of the fastener.

The proximate ends of the shank 14 and stem 22 are joined by a stud weld 24 having significantly greater tensile strength than the collar portion 20 so that it is capable of transmitting to the shank sufficient tensile stress to cause rupture of the collar portion 20.

The head 12 and shank 14 of the fastener pin may be formed, for example, of a relatively expensive metal or alloy such as titanium, beryllium or Multiphase alloy, while the stem 22 is formed of a substantially less expensive material such as carbon steel or stainless steel. The stud weld 24 may be accomplished by any of a number of processes, for example, capacitor discharge welding or friction welding, among others.

Figure 2:
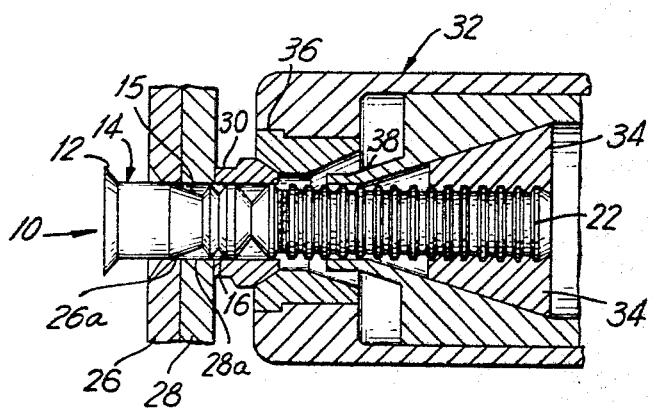
FIGURE 2 is a vertical sectional view through the applicator tool and a pair of sheet metal members during an early step in the process of securing the members together by a fastener incorporating the pin of FIGURE 1.

In FIGURE 2, the pin is shown with the shank 14 inserted through aligned holes 26a and 28a in a pair of sheet metal members 26 and 28, respectively, which are to be fastened together. A collar 30 is inserted over the shank 14 of the fastener and an applicator tool, generally designated 32, is shown in proper position to commence application of the fastener, with its clamping jaws 34 in engagement with the grooved stem 22, and with its swedging die 36 against the outer end of the collar 30.

Figure 3:
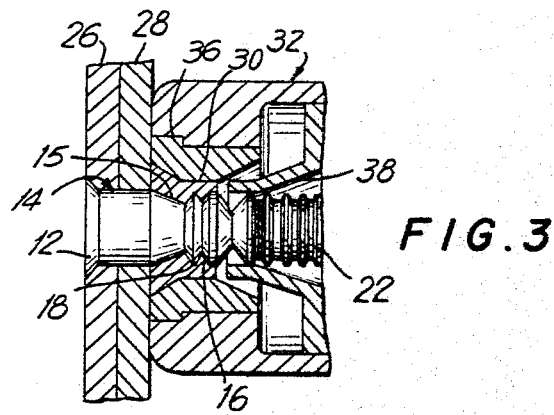
FIGURE 3 is a fragmentary vertical sectional view similar to FIGURE 2 but showing a subsequent step in the application of the fastener.
Figure 4:
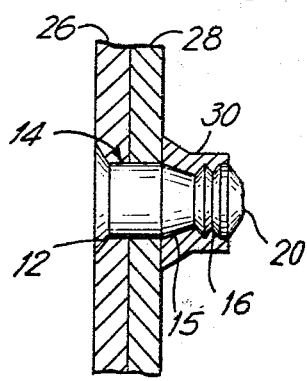
FIGURE 4 is a vertical sectional view through the members showing the fastener after its application is completed.

In FIGURE 3, these same parts are shown after the clamping jaws 34 have been retracted first to pull the fastener pin 10 until its head 12 is fully seated in the countersunk hole 26a and the two sheet metal members 26 and 28 are pressed together tightly, and then to pull the collar 30 into the die 36, swedging the collar inwardly into locking engagement with the grooves 15 and 16. Finally, as shown in FIGURE 4, the tensile stress causes rupture of the neck portion 20 of the shank adjacent the outer end of the collar 30, and the collar is disengaged from the die 36 by outward movement of an ejecter sleeve 38 against the outer end of the collar, to complete the application of the fastener. The less expensive stem portion 22 may then be discarded. The saving in material costs effected through the use of cheaper metal for the disposable stem of the fastener pin is much greater than the slight increase in fabrication cost entailed in assembling and welding together the two dissimilar metal parts.

As will readily be appreciated by those skilled in the art, the present invention, of which only one illustrative form, out of many possible variations, is shown and described, provides a practical fastener pin for use with swedgable collars which may be applied in exactly the same way and will function in exactly the same way as the more expensive fastener pins integrally formed of a single piece of metal.

I claim:

1. For use with a fastener collar adapted to be swedged inwardly into locking engagement with a fastener pin therein, a fastener pin having a head, a cylindrical shank extending therefrom with at least one indentation in said shank, a frangible neck portion near the outer end of said shank beyond said indentation, and a disposable stem extending axially from said shank for engagement by a tensioning device cooperable with a swedging die engaging said collar to impose a tensile stress on said shank reacting against said swedging die to cause swedging of said collar into locking engagement with said indentation, said stem being formed of a metal dissimilar to and less expensive than that of said shank, with the end of said stem being secured to the end of said shank by a stud weld having greater tensile strength than said frangible neck portion, whereby said stud weld will transmit from said tensioning device sufficient tensile stress to cause rupture of said neck portion.

2. For use with a fastener collar adapted to be swedged inwardly into locking engagement with a fastener pin therein, a fastener pin having a head, a cylindrical shank extending therefrom with at least one indentation in said shank, a frangible neck portion near the outer end of said shank beyond said indentation, and a disposable stem extending axially from said shank for engagement by a tensioning device cooperable with a swedging die engaging said collar to impose a tensile stress on said shank reacting against said swedging die to cause swedging of said collar into locking engagement with said indentation, said stem being formed of a metal dissimilar to and less expensive than that of said shank, with the end of said stem being secured to the end of said shank by joining means having greater tensile strength than said frangible neck portion, whereby said joining means will transmit from said tensioning device sufficient tensile stress to cause rupture of said neck portion.

References Cited

UNITED STATES PATENTS

| | | |
|---|---|---|
| 910,434 | 1/1909 | Thompson. |
| 2,531,048 | 11/1950 | Huck _____ 85—5 |
| 2,663,270 | 12/1953 | Friedly _____ 85—37 X |

RAMON S. BRITTS, Primary Examiner